Aug. 18, 1970     H. B. F. JENSEN     3,525,082
CONDITIONAL ALTERNATIVE PROGRAM BRANCHING
IN AUTOMATED WORKING MACHINES
Filed Oct. 23, 1967     4 Sheets-Sheet 1

INVENTOR
Hermann Børge Funck Jensen

BY Craig & Antonelli

ATTORNEYS

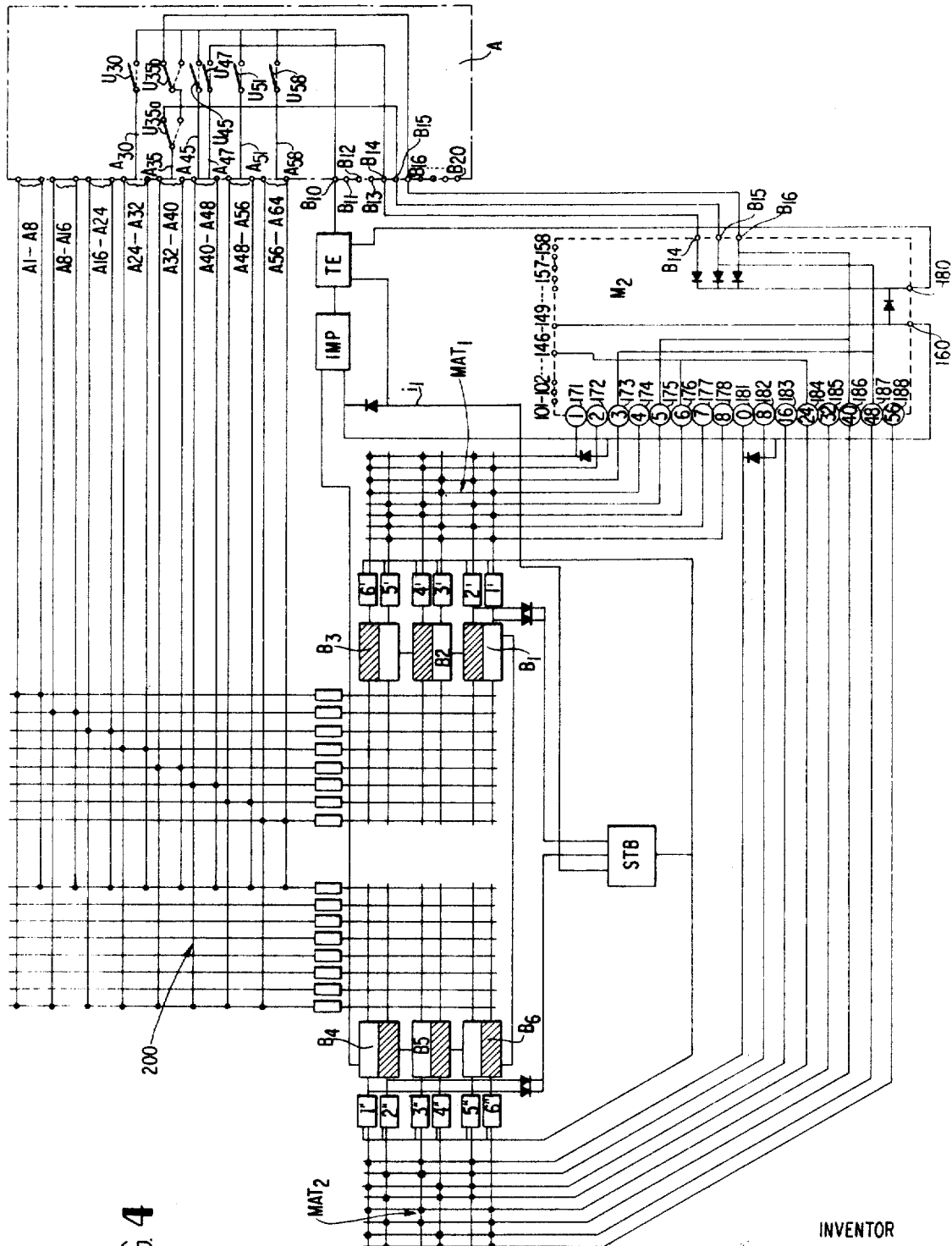

United States Patent Office 3,525,082
Patented Aug. 18, 1970

3,525,082
CONDITIONAL ALTERNATIVE PROGRAM BRANCHING IN AUTOMATED WORKING MACHINES
Hermann Børge Funck Jensen, 16 Moller Meyersvej, Aarhus-Risskov, Denmark
Continuation-in-part of application Ser. No. 413,918, Nov. 25, 1964. This application Oct. 23, 1967, Ser. No. 677,112
Int. Cl. G06f 9/00, 9/18
U.S. Cl. 340—172.5    9 Claims

ABSTRACT OF THE DISCLOSURE

A sequence control in which data signals are produced by feeler devices to indicate the completion of each stage of a normal program, and in which electrically controlled function devices are started and stopped by means of command signals; the data signals are operatively connected with the function devices in response to the coincidence between a completed program step and the conditioning of the sequence control deriving a command signal; a complementary data signal can be produced to initiate an alternative program by jumping from one predetermined stage to another predetermined stage in response to the coincidence of the completion of the program to a predetermined stage and the occurrence of a complementary data signal at such stage.

---

This is a continuation-in-part application of my application Ser. No. 413,918 filed Nov. 25, 1964 and relating to automation of working machines by means of sequence control.

The term "sequence control" used here and in the following shall mean a control system for a working machine in which sensing of data on the machine produced by sensing devices are correlated to commands which are adapted to actuate machine function members on the machine in such a manner that a command to initiate or terminate a machine function is only given when the machine is conditioned therefor according to a planned programme.

The term "working machine" as used here and in the following shall be interpreted in its broadest sense so as to comprise all kinds of machines and plants from simple machine; tools to sophisticated processing plants.

In my copending application Ser. No. 413,918 the disclosure of which is hereby made part of the disclosure of the present application I have disclosed a sequence control substantially as defined hereinbefore wherein the improvement comprises auxiliary switch means for deriving a complementary signal which is operable to release an alternative programme.

It is a purpose of this invention to provide a sequence control system which enables simple jump facilities from any stage of a normal programme to interrupt the normal programme in response to changing conditions and thereby initiate an auxiliary programme which may take care of such corrections of the changed conditions that they are brought back to such normality that the main programme can be allowed to proceed.

Such jump facilities are, in addition to the disclosure of my copending application Ser. No. 413,918, also disclosed in the corresponding French Pat. No. 1,478,322.

Figure 1:
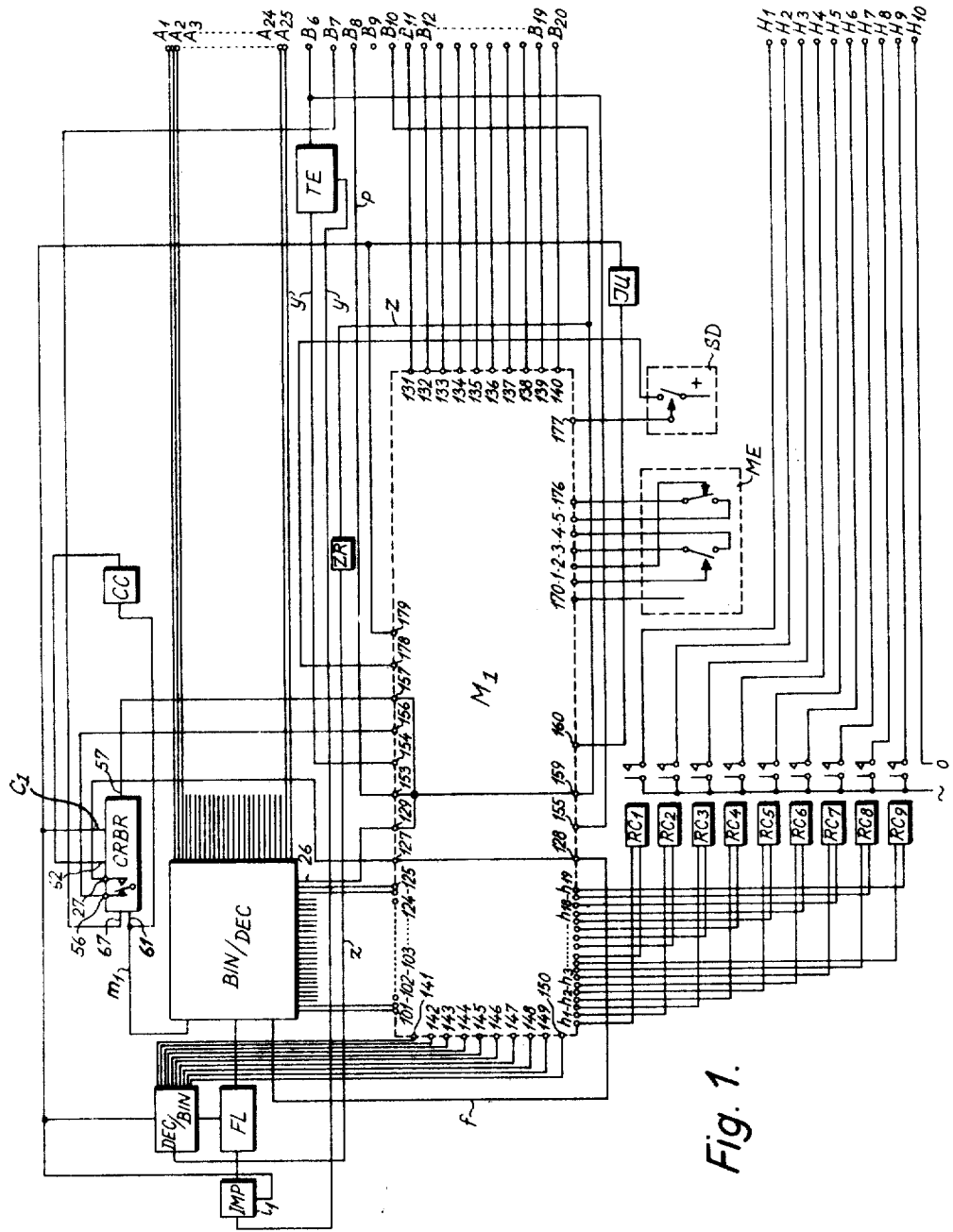
Figure 2:
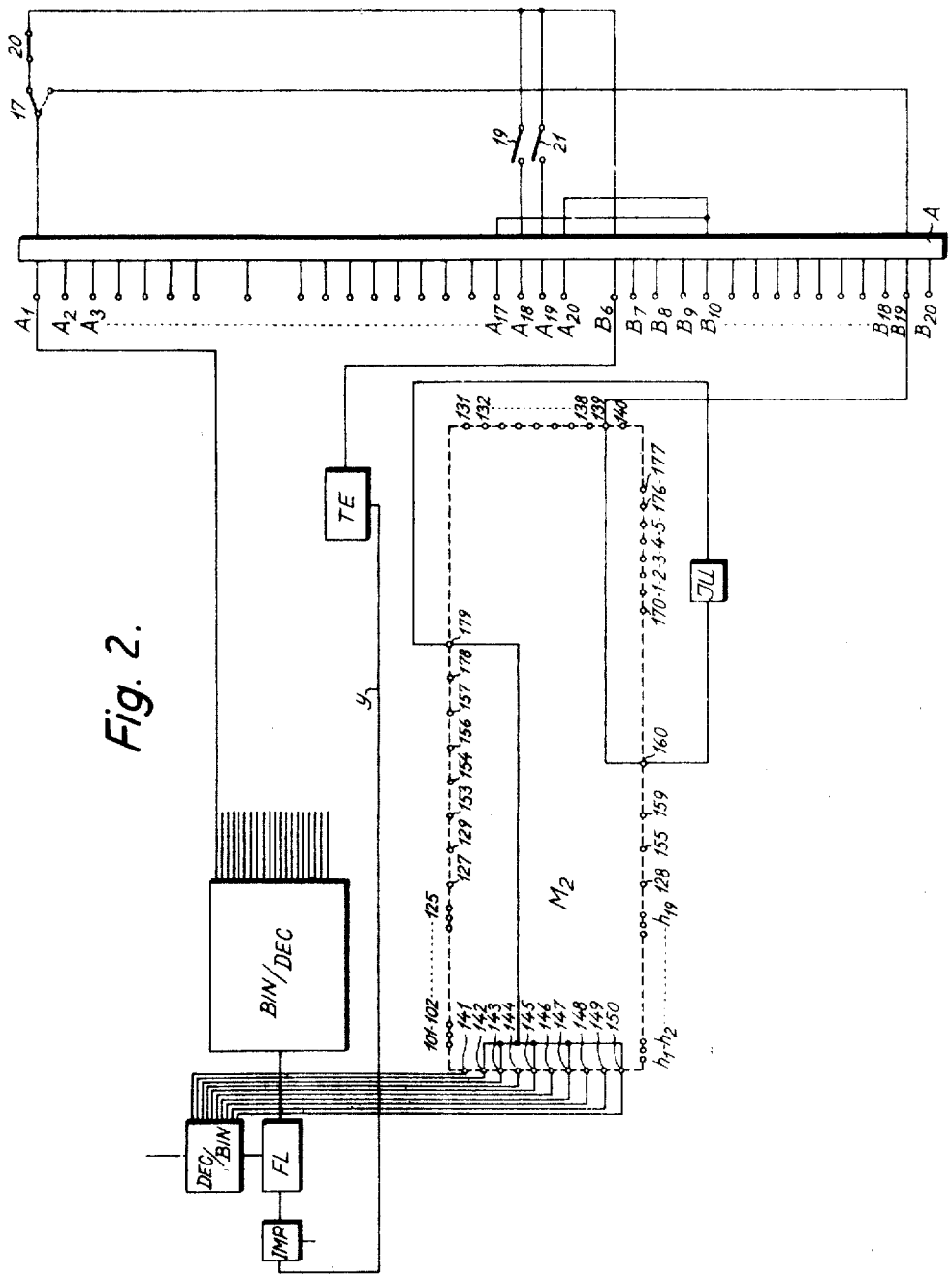
Figure 3:
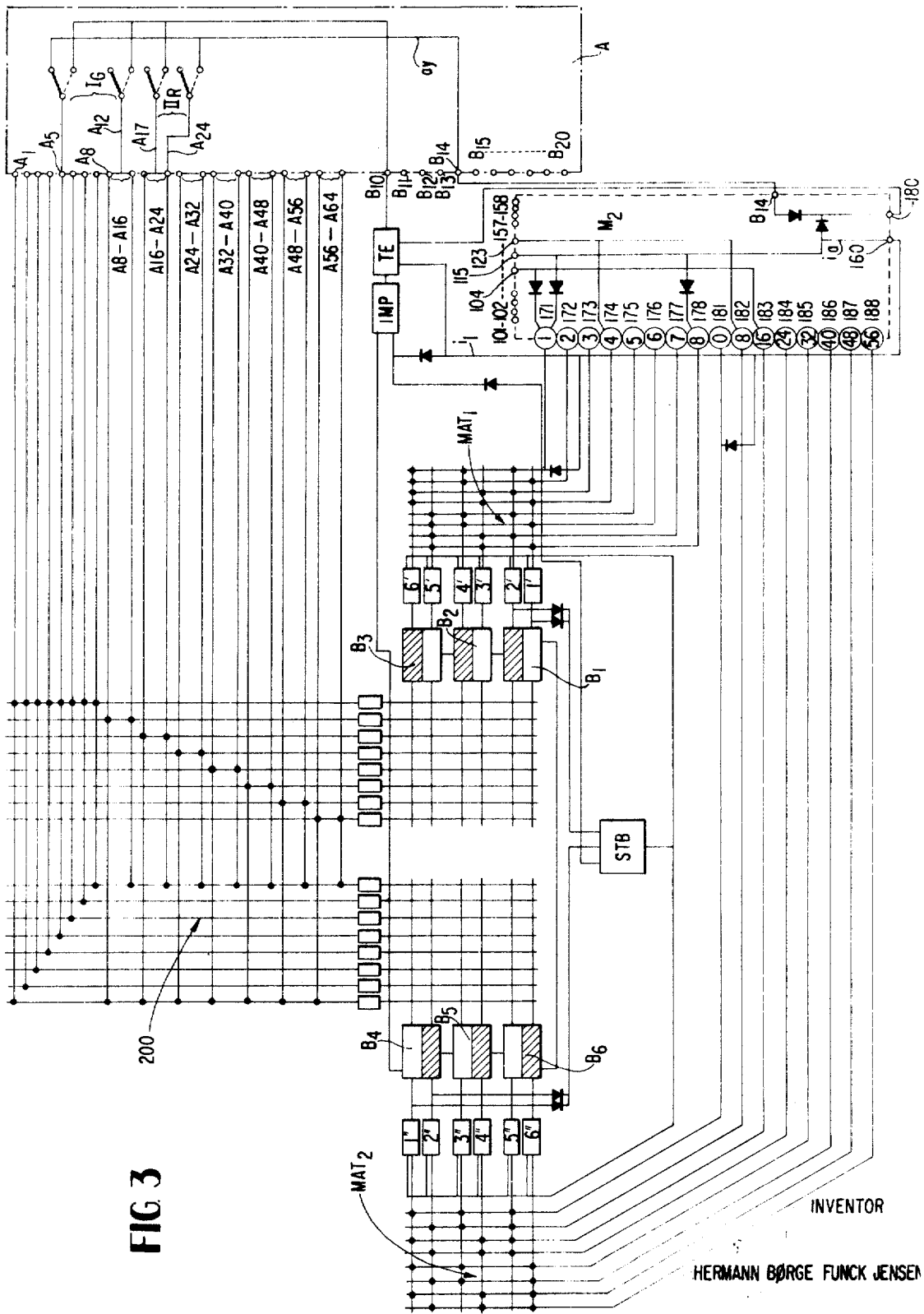

The present invention, however, provides for much more sophisticated and versatile jump facilities than disclosed in my copending application and the French patent specification such as will be apparent from the following specification with reference to the accompanying drawing, in which FIG. 1 is a schematic diagram showing a control unit for use in a sequence control according to the invention, FIG. 2 is a part of the diagram of FIG. 1 illustrating a part of the machine equipment for providing jump facilities, FIG. 3 is a diagrammatic illustration of a more sophisticated sequence control with jump facilities, and FIG. 4 is a modification of the arrangement of FIG. 3.

The control unit of FIG. 1 includes a plurality of circuit networks, the majority of which are described in my application Ser. No. 413,918 hereinbefore referred to.

A plurality of sensing signal output terminals $A_1$–$A_{25}$ are connected with a binary-to-decimal converter BIN/DEC which also has outputs to terminals 101–126 of a control unit distributer which is wired according to a programme chart to issue the commands to start or stop the actions on the working machine.

The commands to the machine actions are distributed through a plurality of command channels, in the example shown nine channels, having output terminals $H_1$–$H_9$. Command relays $RC_1$–$RC_9$ are provided each in one of the command channels. These relays include electronic networks as disclosed in my application Ser. No. 413,918 and are adapted to be energized to start the actions in response to input signals to one terminal from each of nine input terminals $h_1$–$h_9$ of the distributer $M_1$ and to stop the actions in response to input signals on another terminal each connected with input terminals $h_{11}$–$h_{19}$.

The binary-to-decimal converter BIN/DEC is connected with a flip-flop arrangement FL which in normal operation acts as a progressive switch arrangement and is switched by means of impulses produced in an impulse network IMP which is activated from data signals from the machine coming from an input terminal $B_6$ through a test circuit network TE and a line $y$ to the input of the impulse network IMP.

CRBR is a control network which includes a relay arrangement adapted to be switched on in response to actuation of a starter switch and to fall out in the case of any faults. This network which in the following will be referred to as the circuit breaker has a plurality of inputs and outputs.

A control unit terminal $B_7$ is in input terminal to the circuit breaker CRBR to a terminal 67 thereof.

One feature of the control unit of FIG. 1 is that its distributer $M_1$ which is adapted to be cross wired to correlate the sensing signals which result in signals on the terminals 101–125 with command signals to the function channels by means of appropriate connections to the channel input terminals $h_1$–$h_9$ and $h_{11}$–$h_{19}$, in addition to these two sets of terminals has other input and output terminals for various purposes as will appear from the following specification.

An output 27 from the circuit breaker is connected with a terminal 127 of the distributer $M_1$. In the distributer a permanent connection is made from the output terminal 127 to an input terminal 128 which through a line $f$ is connected with the binary-to-decimal converter BIN/DEC to render that decimal line operative which at each moment responds to the binary coding of the flip-flops FL.

An input terminal 153 is through a line $p$ connected with the control unit terminal $B_8$ which is connected with plus output from a power pack (not shown) by means of which the whole system is energized. Thereby the output terminal 153 is permanently available in the distributer as a supply for auxiliary equipment included in the control unit when such equipment is going to be included in the circuits for a specific programme purpose.

154 is an output terminal to the distributer $M_1$ connected with the test circuit network TE and adapted to be activated independently of the sequence. If for example a specific machine function which is included in a command channel has to be switched on as a general condition and retained, the output terminal 154 should be connected with the start terminal of the control relay in the corresponding channel.

156 is an output terminal in the control unit distributer from a corresponding output terminal 56 on the circuit breaker, on which a signal occurs when the circuit breaker falls out.

157 is an output terminal to the distributer $M_1$ from a corresponding output terminal 57 of the circuit breaker on which a short direct current signal occurs when the circuit breaker is switched on.

A permanent wiring is made between the output terminal 157 and the output terminal 129 and to an input terminal 159, which is connected with a general input terminal $B_{10}$ as well as through a network ZR included in a line z with the input of a network DEC/BIN which is a decimal binary converter which is connected with the flip-flop circuitry FL.

The binary decimal converter BIN/DEC in its turn is through a line $m_1$ connected with an input 61 of the circuit breaker and through a network CC with an input 62 thereof.

The circuit breaker furthermore has an output $c_1$ which is connected with the input of the decimal binary converter DEC/BIN as well as with an input $i_1$ of the impulse network IMP.

These various connections operate substantially as follows:

When the circuit breaker is switched on, the direct current signal from the output 57 which only lasts until the relay has established its own holding circuit gives through the permanent connection between the output terminal 157 and the input terminal 159 through the line z and the network ZR a reset signal to the flip-flops so that they will be reset to enable decimal line No. 1 to be rendered effective. In addition to this a signal from the output $c_1$ of the circuit breaker is applied to the input terminal $i_1$ of the impulse network or line shift circuit and causes a temporary inhibition thereof for line shift in response to signal from the input terminal $B_6$, the test circuit network TE and the line y.

The connection from the terminal 27 of the circuit breaker through the input terminal 127 to the output terminal 128 and to the binary decimal converter BIN/DEC provides in connection with the line $m_1$ from the binary decimal converter to the network CC and the connection from the output 61 of the circuit breaker that if more than a predetermined current is drawn through the system, or if more than one decimal line are rendered effective at the same time, the network CC will give an input on the terminal 62 of the circuit breaker whereby the circuit breaker will fall out.

The system briefly described hereinbefore has 25 sensing lines and as apparent the 26th line is connected with the input terminal 129 which by means of its permanent connection to the output terminal 159 results in a reset signal through the line z so that when the full programme is utilized with all 25 sensing lines the system will automatically reset itself.

In case of a smaller programme with less than 25 sensing lines utilized as apparent from the following example, the sensing line subsequent to that last used for a sensing of the machine must be connected with the terminal $B_{10}$ so that through this and its connection to the zero reset network ZR a reset signal is given.

As obvious from the foregoing an inhibition signal is always given from the output $c_1$ of the circuit breaker in the event that it falls out.

In addition the distributer $M_1$ of the control unit has a plurality of other terminals for specific purposes.

One series of terminals marked 170–176 is connected with a network ME which is schematically illustrated as a double switch having one switch connected between the terminals 173 and 174 and another switch connected between the terminal 175 and 176 with activator members connected with the terminals 171 and 172 respectively so that if a signal is applied to the terminal 172, the right hand switch is closed and the left hand switch is opened as indicated, while when a signal is applied to the terminal 171 the left hand switch will be closed and the right hand switch opened. The terminal 170 is a voltage supply terminal for this network which in practice may be a transistorized electronic network with bistable circuits.

The network ME will in the following be referred to as the memory circuit because it can be connected in a manner to be more fully described in the following with a sensing device on the working machine in such a manner that one of the memory switches is closed in response to the activation of the sensing device on the machine. The memory switch is then included in a later line of the sensing system and will, if it has been closed, give the programmed data signal back to the line y.

In the example here illustrated one memory is included in the control unit but as will be apparent from the following example it is possible to use more than one memory in a programme in order to obtain certain advantages.

A further input terminal 177 is connected with a network SD, the other end of which is connected with an output terminal 178. Also the network SD is an electronic network which in principle comprises a switch to which a permanent plus is applied and which is opened if a signal is applied to the input terminal 177 but which gives its plug signal to the output terminal 178 if it is closed because the input to the terminal 177 disappears.

Eventually the schematic control unit circuitry of FIG. 1 includes a network JU which has an input teminal 160 from the distributor and an output terminal 179 to the distributer. In addition the JU network is connected with the inhibition lines.

In principle the JU network is a bistable network in similarity with the networks ZR and CC so that when a signal is applied to the input terminal 160, an output signal will occur on the terminal 179. The JU network will in the following be referred to as the "jump" network because it can be used for setting the flip-flops to render a predetermined decimal line effective by connecting the jump output 179 with appropriate five terminals of a total of ten terminals 141–150 which are connected with the decimal-to-binary converted DEC/BIN according to a predetermined coding.

The general operation of the control unit of FIG. 1 for controlling a working machine or a process will not be described in the following because it is disclosed in great detail in my copending application and the French patent specification hereinbefore referred to.

FIG. 2 illustrates briefly the manner in which the jump facilities of the control unit of FIG. 1 are rendered effective to add an alternative programme.

The normal programme is supposed to comprise the first seventeen lines. This programme is supposed to be repeated as long as the conditions therefor are fulfilled. To this purpose the terminal of line No. 17, $A_{17}$, is connected with the reset terminal $B_{10}$.

If after a certain number of repetitions of the normal programme which can be the stamping out of an article from a stamping press, it is desired to perform an alternative programme, an auxiliary switch 17 is thrown over from the position shown in full lines to the position shown in dotted lines. Thereby the main programme is interrupted when it has been completed and reset to line No. 1. As shown in FIG. 2 the switch 17 is in its thrown-over position connected with the terminal $B_{19}$ which through the connection of terminal 139 of the plugboard via terminal 160 is connected to the pump circuit JU which is connected with the terminal 179 of the plugboard. The terminal 179 is connected with the binary code setting input terminals 142, 143, 145, 147 and 150 which is the coding that responds to line 18. Hereby the binary device is caused to jump from line 1 to line 18 which results in start of the alternative programme and performance of a programme in the lines 18 and 19 which may be in the form of starting a conveyor with boxes which after a certain number of articles having been filled into one box brings a new box in position as described in my copending application.

In the circuit of FIG. 3 the control unit has six binary counters connected in groups with three in each and connected with a multiplication type output matrix 200 from which a total of sixty-four output lines can be provided which are indicated as $A_1$–$A_{64}$.

In the input line to the binary counter $B_1$ which is connected to the flip-flop in order to set it in ZERO or ONE position respectively, a pair of networks $1'$ and $2'$ are provided. Similar networks $3'$ and $4'$ are connected with the flip-flop $B_2$ and $5'$ and $6'$ with the flip-flop $B_3$.

On the other side, networks $1''$, or $2''$ etc. are provided in the input lines to the flip-flop $B_4$, $B_5$ and $B_6$.

The inputs of these networks at one side are connected with a binary matrix $MAT_1$, the input lines to which are connected with a first group of "jump"-terminals of the distributer $M_2$ marked 171, 172, 173, 174, 175, 176, 177 and 178 with the coding being the normal binary code for three flip-flops representing $2^3$ or 1–000, 2–100, 3–010, 4–110, 5–001, 6–101, 7–011, 8–111.

Obviously, if the control unit had only four flip-flops or each group had four flip-flops or more, the matrix would have a corresponding larger number of lines, the remaining parts of which being coded in accordance with the normal binary coding.

In a similar manner the other group of flip-flops $B_4$, $B_5$ and $B_6$ has a matrix $MAT_2$ the input lines of which are connected with another group of input terminals 181–188 of the distributer $M_2$.

The common line $B_{10}$ from the machine equipment through which a data signal is transmitted each time one of the machine sensing devices signals that the corresponding programme stage corresponds to the condition for allowing the programme to proceed, is connected through a test network TE to a trigger network IMP in which each data signal produces a trigger impulse which shifts the counter device from one numerical value to the next following so as to thereby render the lines to the distributer which terminates in terminals 101, 102 . . . 158 effective in sequence.

The test circuit TE has one output which is connected with the terminal 180 and the distributer $M_2$ and a second output which is connected with a conditioning input of a trigger network STB which has two other conditioning inputs connected with the inputs of the binary counter flip-flops $B_1$ and $B_4$, respectively.

The trigger network STB furthermore has an output which is connected with all the inputs of the networks, $1'_1$–$6'_1$ and $1''_1$–$6''_1$.

Eventually the distributer $M_2$ has a terminal 160 which through diodes is connected with the terminals 171 and 181 of the distributer as well as with an inhibition input of the trigger circuit IMP. This trigger input is also connected with the output to the line $i_1$ of the test network TE.

In the machine equipment as indicated a sensing switch is included in line $A_5$ which is supposed to cause a part programme scheduled between lines 17 and 24 to be rendered effective in the event that the switch in line 5 gives the complementary signal to that which causes sequensing signal on $B_{10}$.

In line 24 a sensing switch is included which when activated is supposed to cause the programme to proceed from line 12 to line 16 in which in such event the programme should be terminated.

As an example, a sequence controlled painting plant can be mentioned adapted to handle two sizes of articles which are supposed to be painted with different colors, for example green between the lines $A_5$ and $A_{12}$ and red between the lines $A_{17}$ and $A_{24}$. In both cases the articles are going to be dried after having been painted which is controlled by means of the part programme between the lines $A_{12}$ and $A_{16}$.

Supposing the switch in line $A_5$ is adapted to be closed, i.e. moved to the dotted-line position in response to the articles of large size, and these are the ones which have to be painted green, the closing of the sensing switch in line $A_5$ by the passage of an article of large size will cause a signal to appear on $B_{10}$ and allow the programme to proceed with the green painting as indicated by IG performed between lines $A_5$ and $A_{12}$ and subsequent drying between lines $A_{12}$ and $A_{16}$.

In the distributer the line $A_{16}$ is represented by the terminal 115 which is connected with the terminal 160 which in its turn through valves is connected with the lines leading from the terminals 171 and 181 so that a signal applied to these lines will set both groups of binary counters into the ZERO position. Simultaneously an inhibition signal will be applied to the trigger impulse network IMP.

If the sensing switch in line $A_5$ is not closed to the dotted-line position due to the presence of an article of small size, the complementary signal from the sensing switch in line 5 is through an alternative programme $a_y$ applied to a terminal $B_{14}$ which in the distributer through a diode is connected with the terminal 180 so that a signal is applied to the test circuit TE from which the signal through the line $i_1$ is applied to the trigger circuit STB. This signal causes the setting of the binary counter to the desired line but in order to condition the binary counters for being set to that line, for example to jump from line 5 to line 17, the matrixes must be conditioned for such jump. It must be remembered that in line $A_5$ the effective terminal of the distributer $M_2$ is the terminal 104. To condition the arrangement for jump from line 5 the terminal 104 is therefore through diodes connected with the terminals 1 and 183.

This combination will be appreciated in the following manner:

As indicated in the circles the terminals 171–178 are assigned to the numbers 1–8, while the terminals 181–188 are assigned to the numbers 0, 8, 16, 24, 32, 40, 48 and 56, respectively.

The simple rule is that when the binary counters should be conditioned for jump to a line, the effective line from which jump has to take place must be connected with these two terminals, the sum of which gives the number to which jump has to take place. In the present instance jump from $A_5$ to $A_{17}$ requires the effective terminal 104 to be connected with the two terminals having the numerical values 1 and 16, respectively. It will be appreciated that a jump to 16 cannot be obtained by merely connecting a terminal to 183. A connection is always necessary to a terminal in each of the groups so that a jump to for example line 16 requires connection to the terminals 178 and 182, each of which represents the numerical value 8.

As apparent from the foregoing description, signal applied from the terminal 104 to the terminals 171 and 183 results in jump from line $A_5$ to line $A_{17}$.

The system here described corresponds to an octale code. As apparent from the connection shown in the matrixes, the combination one and two is included in each code. The two input lines from the binary counters $B_1$ and $B_4$ to the trigger network STB thereby secure that the networks are conditioned for jump. If the combinations are not present, and no signal is applied to these two inputs of the STB-network, this network will be inhibited so that a signal applied through the line $i_1$ will not cause the jump trigger impulse.

With jump from line $A_5$ to line $A_{17}$ it is supposed as mentioned hereinbefore that the articles are painted red in a part programme between line $A_{17}$ and $A_{24}$. In line $A_{24}$ the sensing switch is actuated to give "yes"-answer to indicate that the alternative programme has been finished. This is supposed to cause jump back to line $A_{12}$.

Line $A_{24}$ is in the distributer $M_2$ represented with the terminal 123. In order to condition the programme to jump from line $A_{24}$ to line $A_{12}$ the terminal 123 is connected with the terminals 174 and 182 which represent the two terminals having numerical values 4 and 8 respectively, giving the sum 12.

The programme hereby jumps back to line $A_{12}$, and in line $A_{16}$ the connections from the terminal 115 in the distributer will as mentioned hereinbefore through its connection with the terminal 160 cause the whole arrangement to be reset.

FIG. 4 illustrates a modification of the arrangement of FIG. 3 and is supposed to relate to a machine tool with a sensing device for quality control in line 35.

This sensing device comprises two switches $U_{35a}$ and $U_{35b}$ in line 35. The switch $U_{35a}$ provides "yes"-answer to the question whether the size of an article produced is above minimum-size, and the switch $U_{35b}$ gives "yes"-answer to the question whether the size is below maximum. This means that if both switches are closed, i.e. in the position shown in dotted lines, the workpieces produced are within the prescribed tolerances and the programme can be allowed to continue because the line remains closed through the series connection of these two switches.

It is supposed that if the workpieces are below minimum they are going to be rejected automatically by means of a rejection programme performed between lines 51 and 58.

It is also supposed that if they are too large, the machining is going to be repeated by means of that part of the normal programme which lies between lines 30 and 35 and that thereby a jump back to line 30 is going to take place.

In other words if the switch $U_{35a}$ is not actuated and remains in the position shown in full lines, this constitutes a "no"-answer to the question whether the size is above minimum, and the "no"-answer is transmitted through the connection shown to the terminal $B_{15}$. A similar connection is shown from the switch $U_{35b}$ to the terminal $B_{16}$.

The terminals $B_{15}$ and $B_{16}$ are connected with the terminal 180 and through diodes.

The terminal $B_{15}$ is in addition connected with that combination of terminals, namely 173 and 187, which as explained in connection with FIG. 3 corresponds to the value 51, namely 3+48.

This means that when the connection to the terminal $B_{15}$ is rendered effective, when the switch $U_{35a}$ is not actuated, a jump of the programme to line 51 is effected whereafter the programme proceeds to line 58. During that part of the programme which is an alternative programme part, the workpiece is rejected and at the same time this alternative programme may cause an adjustment of the tools which have cut too much.

When in line 58 the switch $U_{58}$ is closed, connection is established to the terminal $B_{10}$ to reset the programme to line 1, whereafter the whole normal programme is repeated.

If the workpieces are of a size above maximum this means that the tool has not cut enough and the cutting operation should in this event be repeated. This can be obtained by a jump back to line 30 so as to repeat the programme between line 30 and line 35 which is that part of the programme during which the cutting takes place.

To this purpose two connections for transmission of the "no"-answer are provided to the terminals $B_{15}$ and $B_{15}$ which through diodes are connected with the terminal 180, and the terminal 146 which conditions the whole system for jump is connected with the terminals 176 and 184, the sum of which corresponds to the numerical value 30.

Under most circumstances the reason why the size of the workpieces is above maximum will such as in a turret lathe be that the tool needs an adjustment so that before jumping back to line 30 and repeat the cutting action, an adjustment of the tool may be necessary which is supposed to be in the form of an auxiliary programme between the lines 45 and 47.

Obviously the "no"-answer from the sensing switch $U_{35b}$ shall first cause a jump to line 45. To this purpose the terminal $B_{15}$ is as shown connected with that combination of terminals, namely 175 and 186 which gives the numerical sum 45.

When thereafter the readjustment of the tool has been completed in line 46 and the cutting operation is going to be repeated a jump is necessary from line 47 back to line 30.

To this purpose the sensing switch $U_{47}$ in line 47 is connected with the terminal $B_{14}$ which also is connected with the terminal 180, and at the same time the plugboard terminal 146 is connected with the two terminals 176 and 184 which prepare the jump to line 30.

When in such case or during the normal programme the quality control shows that the workpieces are of a size within the desired tolerances, the reject programme between lines 51 and 58 shall be by-passed and to this purpose the terminal 149 of the plugboard which corresponds to line 50 is connected with the terminal 160 and causes reset from line 50.

These possibilities of a complicated programme where the jump facilities are utilized extensively are only described as examples and it will be possible within the scope of the invention to programme the system for a plurality of alternative programmes to be used in different patterns depending on the condition of the working machine or process which is automatically controlled by means of the sequence control according to the invention.

It will be appreciated that the invention is neither limited to use of the sequence control in connection with machine tools.

By way of example it will be possible in a plant for processing different fluids under different conditions to programme the sequence control with alternative programmes corresponding to the different conditions either as completely different programmes or as different part porgrammes between which a jump is made in response to a signal which is indicative of which of the two programmes is going to be used, and it will also be possible to include in such process control a rinsing programme which is interposed between the two other programmes when there is changed over from the supply of one fluid to another fluid so as to thereby avoid contamination.

What I claim is:

1. A sequence control having a plurality of stages and comprising data signal means to indicate by means of feeling devices the completion of each stage of a normal programme as it proceeds, electrically controlled function means which can be started and stopped by means of command signals, and coincidence means including switch means operatively connecting said data signal means and said function means and operable in response to coincidence between a completed programme step and conditioning of the sequence step to condition the sequence control for a command signal to be derived therefrom and having means included in said data signal means for producing a complementary data signal which is operable to release an alternative programme wherein the improvement comprises a plurality of data signal means for producing a complementary data signal each having an output for such complementary data signal, circuit line means for transmitting said complementary data signals, means operatively connecting said circuit line means to transmit a complementary data signal to said coincidence means, and means operable to condition said coincidence means for jump from one predetermined stage to another predetermined stage in response to coincidence of the completion of the programme to said first predetermined stage and occurrence of a complementary data signal at said first stage.

2. A sequence control as claimed in claim 1, in which the coincidence means is a binary type switch means having two groups of binary network means each connected with a matrix means, a plurality of data signal circuit means connected with said binary type switch means to be selectively rendered effective, a conditioning network means including conditioning matrix means operatively connected with each of said binary type switch means in each of said two groups, and circuit means operatively connecting said data circuit means with said conditioning matrix means to select said conditioning network means according to a binary type coding to be rendered effective when a selected one of said data circuit means is rendered effective at a predetermined stage of the programme, as well as circuit means for transmitting that complementary data signal to said conditioning network means which is produced at the correlated stage of the programme.

3. A sequence control as claimed in claim 2, in which each group of binary network means of said binary type switch means includes three binary networks, and the conditioning network means is adapted to be set according to an octale type coding.

4. A sequence control as claimed in claim 2 comprising distributer means having a plurality of inputs operatively connected with said data circuit means to be rendered selectively effective as the data circuit means are rendered effective, and a plurality of outputs operatively connected with said conditioning matrix means for rendering said conditioning network means operable to transmit a complementary data signal to said binary type switch means according to a binary type coding provided by connection between one of said distributer inputs and the appropriate ones of said distributer outputs.

5. A sequence control as claimed in claim 2, comprising distributer means operatively connected with said data signal circuit means having a plurality of inputs each to be rendered effective in response to the effectiveness of a correlated data circuit means, and two groups of outputs each comprising eight terminals connected with each of the two groups of conditioning matrix means for rendering said conditioning network means effective to transmit a complementary data signal to said binary type switch means in response to a connection in said distributer between an input and an output in each of said two groups.

6. A sequence control as claimed in claim 4, in which said distributer means has an input operatively connected with said circuit line means for transmitting said complementary data signals and an output adapted to be connected with said input through said distributer means, and circuit means operatively connecting said output from said distributer means with said conditioning network means.

7. A sequence control as claimed in claim 6, in which said connecting circuit means include a trigger circuit means having three inputs, of which one is operatively connected with said complementary data signal circuit means and the two others connected with those two of said binary circuit means which correspond to the lowest numerical values of the binary means so as to be effectively conditioned for trigging by ZERO or ONE and to be trigged only in response to supply of a complementary data signal.

8. A sequence control as claimed in claim 7, comprising a trigger circuit for switching said coincidence means in response to the completion of each stage of the normal programme, means for inhibiting the trigging of said trigger circuit means, and means for rendering said inhibition means effective in response to the occurrence of a complementary data signal.

9. A sequence-control as claimed in claim 5, in which each group of binary network means of said binary-type switch means includes three binary networks, and a conditioning network means is adapted to be set according to an octale-type coding.

References Cited

UNITED STATES PATENTS

| | | | |
|---|---|---|---|
| 3,377,623 | 4/1968 | Reut et al. | 235—151.1 |
| 3,343,141 | 9/1967 | Hackl | 340—172.5 |
| 3,334,334 | 8/1967 | Halpin | 340—172.5 |
| 3,324,458 | 6/1967 | MacArthur | 340—172.5 |
| 3,311,885 | 3/1967 | Propster | 340—172.5 |
| 3,308,279 | 3/1967 | Kelling | 235—151.11 |
| 3,253,438 | 5/1966 | Stringer | 235—151.11 |
| 3,234,519 | 2/1966 | Scholten | 340—172.5 |
| 3,048,332 | 8/1962 | Brooks et al. | 340—172.5 |

GARETH D. SHAW, Primary Examiner